3,789,047
ETHYLENE COPOLYMER DISPERSIONS FOR FLAME RETARDATION AND FIBROUS ARTICLES COATED THEREWITH
Gerfried Pruckmayr, Media, Pa., assignor to E. I. du Pont de Nemours and Company, Wilmington, Del.
No Drawing. Continuation-in-part of application Ser. No. 176,303, Aug. 30, 1971, which is a continuation of application Ser. No. 827,175, May 23, 1969, now abandoned. This application Oct. 25, 1972, Ser. No. 300,812
Claims priority, application Canada, May 21, 1970, 83,383
Int. Cl. C08f 45/30
U.S. Cl. 260—28.5 R         2 Claims

ABSTRACT OF THE DISCLOSURE

An aqueous dispersion of an ethylene copolymer, a chlorinated paraffin wax and antimony trioxide is provided. The dispersion contains (1) about 70 to 15 percent by weight of an ethylene/vinyl acetate copolymer or an ethylene/methacrylic acid ionomer copolymer, (2) about 30 to 85 percent by weight of a chlorinated paraffin wax having greater than 50 percent by weight chlorine, the total chlorine content of (1) and (2) being 20 to 60 percent by weight, and (3) antimony trioxide in a ratio of antimony trioxide to chlorinated paraffin wax of 0.25:1 to 3:1. Fibrous materials such as fiberfills or textile fabrics are rendered flame retardant when coated with the dispersions.

CROSS-REFERENCE TO RELATED APPLICATIONS

This is a continuation-in-part of application Ser. No. 176,303, filed Aug. 30, 1971 which in turn is a continuation of application Ser. No. 827,175, filed May 23, 1969 both now abandoned.

BACKGROUND OF THE INVENTION

Field of Invention

This invention relates to stable aqueous dispersions of ethylene copolymers, chlorinated paraffin waxes and antimony trioxide, and fibrous materials coated therewith. More particularly, this invention relates to stable aqueous dispersions of ethylene/vinyl acetate copolymers or ethylene/methacrylic acid ionomer copolymers, chlorinated paraffin waxes and antimony trioxide, useful as flame-retardant coatings for textile fabrics.

Prior Art

Blends of chlorinated paraffin waxes with ethylene/vinyl acetate copolymer resins have been used, in the form of melt blends and solutions in organic solvents, for the preparation of pressure-sensitive adhesive compositions, heat-sealable moisture barrier coatings and non-skid rug backings.

The preparation of melt blends, however, has severe limitations. Since chlorinated paraffin waxes decompose rapidly at elevated temperatures, only quite low melting resins can be blended with chlorinated paraffin waxes. This method cannot be used with high-melting resins, for instance, ethylene/vinyl acetate copolymer resins having a melt index of less than 15.

The preparation of solution blends of chlorinated paraffin waxes and ethylene/vinyl acetate copolymer resins in organic solvents has similar limitations. Many polymers, e.g., the ethylene ionomer resins, are only sparingly soluble or are insoluble at room temperature, and even at elevated temperatures in high-boiling organic solvents their solubility is quite low. Solutions of more soluble polymers, on the other hand, present solvent-recovery problems and/or air-pollution problems; if used on a larger scale, toxicity problems and frequently substrate compatibility problems.

SUMMARY OF THE INVENTION

According to the present invention there is provided a storage stable aqueous dispersion comprising as essential ingredients: (1) about 70 to 15 percent by weight, based on the total ethylene copolymer and chlorinated wax, of an ethylene copolymer comprising at least 30 percent by weight of ethylene and up to 70 percent by weight of at least one polar monomer, (2) about 30 to 85 percent by weight, based on the total ethylene copolymer and chlorinated wax, of a chlorinated paraffin wax having greater than about 50 percent by weight chlorine, the total chlorine content of (1) and (2) being within the range of about 20 and 60 percent by weight, and (3) antimony trioxide wherein the ratio of antimony trioxide to chlorinated paraffin wax is within the range of about 0.25:1 and 3:1.

There is also provided an article of manufacture comprising: fibrous material, such as a textile fabric, coated with the above dispersion. Such a coating renders the fibrous material flame retardant.

DETAILED DESCRIPTION OF THE INVENTION

The dispersions of the present invention are prepared by adding a dispersion of the antimony trioxide to a dispersion of the ethylene copolymer and chlorinated paraffin wax. The latter dispersion can be prepared by a post-dispersion process such as described in U.S. Pat. 3,296,172 issued to D. L. Funck and V. C. Wolff, Jr. on Jan. 3, 1967, U.S. Pat. 3,347,811 issued to T. C. Bissot on Oct. 17, 1967, and U.S. Patent application Ser. No. 801,741 filed by Thomas C. Bissot on Feb. 24, 1969. Alternatively, these dispersions can be prepared by blending dispersions prepared separately. When codispersed according to Ser. No. 801,741, conventional surfactants are not needed, but may be desirable; however, when separate dispersions are prepared and then blended, a conventional surfactant having an HLB number greater than 18 will be needed to disperse the chlorinated paraffin wax. Such surfactants are known to those skilled in the art. The resulting dispersions have a high solids content, on the order of 50 to 75 percent by weight, but are generally diluted to 20 to 45 percent solids when applied as a coating on fabric. They are indefinitely storage stable at room temperature and can be coalesced into strong self-supporting films by removal of the aqueous medium either at room temperature or at elevated temperatures up to 130° C., as required for maximum strength of the particular film.

The ethylene copolymers useful in the present invention have an ethylene content of at least 30 percent by weight, preferably 60 percent by weight, and up to 70 percent by weight of at least one polar monomer. Among others, examples of monomers having polar characteristics are: vinyl esters of carboxylic acids such as vinyl formate, vinyl acetate, vinyl propionate and vinyl butyrate; unsaturated carboxylic acids such as acrylic acid, methacrylic acid, itaconic acid and maleic acid; acrylates and methacrylates such as methyl methacrylate, ethyl acrylate and isobutyl acrylate; halogenated vinyl compounds such as vinyl chloride and vinylidene chloride, vinyl alcohol (hydrolyzed vinyl acetate); acrylamide, β-dimethyl-aminoethyl methacrylate, β-hydroxyethyl acrylate and other adhesion-promoting monomers having carboxyl, amido, amino or hydroxyl groups.

One particularly preferred copolymer is a copolymer of ethylene and vinyl acetate having at least 60 percent by weight ethylene, 17 to 40 percent by weight vinyl acetate and 0 to 5 percent by weight of an alpha, beta-ethylenically unsaturated carboxylic acid, such as acrylic acid or methacrylic acid. Such copolymers are generally prepared by high-pressure free-radical catalysis processes, but they can also be prepared by low-pressure coordination catalysis processes. Exemplary patents illustraing copolymer preparation are U.S. Pat. 2,703,794 issued to Milton J. Roedel on Mar.. 8, 1955 and U.S. Pat. 3,215,657 issued to Aleksander Beresniewicz on Nov. 2, 1965. The molecular weight can be varied over a wide range; however, copolymers having molecular weights corresponding to melt indexes of 1 to 150, particularly under 15, are especially suited for use in this invention. Copolymer melt index is determined as described in ASTM–D–1238–65T.

Another particularly preferred copolymer is a copolymer of ethylene and an alpha, beta-ethylenically unsaturated carboxylic acid containing at least 60 percent by weight, preferably 80 percent, ethylene and 0.3 to 40 percent by weight of the acid, preferably 0.3 to 20 percent, and having about 10 to 100 percent of the acid groups neutralized with alkali metal ions such as $Na^+$ or $K^+$. Typical acids are acrylic acid, methacrylic acid, fumaric acid, maleic acid, itaconic acid and aconitic acid. Acid derivatives of the aforesaid, such as esters, anhydrides and the like also can be employed as monomers. While these derivatives must be convertible to a free carboxylic acid group prior to the formation of the dispersion, it is not necessary that all such derivatives be converted to free carboxyl groups. Preparation of these dispersions with neutralization of the acid groups with sodium hydroxide is described in U.S. Pat. 3,296,172. The preferred acid monomer is methacrylic acid. Molecular weight preferences are as described above with reference to the copolymers of ethylene and vinyl acetate.

The chlorinated paraffin waxes useful in the present invention have a chlorine content greater than 50 percent by weight. These materials vary from yellow liquids to brittle resinous solids as the chlorine content increases. The waxes having a chlorine content between 60 and 70 percent by weight are preferred.

Since the dispersions are especially useful as flame-retardant binders and coatings, a high total chlorine content is desirable. Dispersions containing 15 percent by weight of an ethylene copolymer of low melt index and 85 percent by weight of a chlorinated paraffin wax (chlorine content 70 percent) which corresponds to a total chlorine content of about 60 percent by weight have been found to form continuous self-supporting films. Coatings formed from dispersions having less than 30 percent by weight of the same chlorinated wax (corresponding to a total chlorine content of about 20 percent by weight) show inadequate flame-retardant properties. Preferred compositions contain 50 to 75 percent by weight chlorinated paraffin wax and 50 to 25 percent ethylene copolymer, the total chlorine content being from 30 to 50 percent by weight.

The dispersions of the present invention must also contain antimony trioxide, which is added to the ethylene copolymer/chlorinated paraffin wax dispersion as an aqueous dispersion. The amount of antimony trioxide added should provide a ratio of the antimony trioxide to chlorinated paraffin wax of 0.25:1 to 3:1, preferably 0.5:1 to 2:1. Generally, the upper limit is determined by the loss of mechanical properties of the coalesced film or coating and the lower limit is determined by inadequate flame retardance. In addition to the antimony trioxide, the dispersions can optionally contain other flame-retardant materials such as borates and phosphates.

The dispersions of the present invention are especially useful in textile applications as a flame-retardant binder or coating for fibrous materials. These materials can be natural or synthetic fibers in the form of fabrics; non-woven webs or sheets; fiberfill and strings, strands or ropes. Particularly preferred are fiberfills used in the automotive industry and tent canvas.

The invention is further illustrated by the following examples in which parts and percentages are by weight unless otherwise indicated:

Example 1

An aqueous dispersion of an ethylene/vinyl acetate copolymer and a chlorinated paraffin wax was prepared as specified in U.S. Pat. 3,347,811, Example 6, by mixing equal parts by weight of ethylene/vinyl acetate copolymer containing 28% by weight of vinyl acetate and having a melt index of 2–6, with a chlorinated paraffin wax containing 70% by weight chlorine ("Chlorowax" 70 S) in a low-boiling organic solvent system (e.g. cyclohexane/n-propyl alcohol), adding water and surfactant to this solution, and removing the organic solvent by evaporation until a dispersion of 50–55% solids was obtained. On evaporation at room temperature or at elevated temperatures (e.g., about 90° C.) this dispersion coalesced into a translucent, strong film, containing 35% by weight chlorine.

One part of this dispersion was then mixed with 1 part of an aqueous 25% solids dispersion of antimony trioxide having a pH above 7 and stabilized with a basic surfactant, sodium lauryl sulfate ("Duponol" WAQE). This resulting dispersion system was used to impregnate flammable fabrics to render them fire retardant by impregnating different samples of cotton fabric to an add-on of 30–40%. The impregnated and dried samples were tested in a modified fire-retardance test (ASTM D–626–55T).

The fire-retardance test consisted of clamping fabric samples 2 inches by 10 inches vertically in a shielded test chamber, ¾ inch above a micro Bunsen burner, and igniting the samples by applying a luminous flame of 1.5 inches in length for 10 seconds at the center of the lower edge of the test sample. After removing the burner, the after flame and char lengths of the test samples were recorded.

The test samples impregnated with this dispersion were self-extinguishing (after-flame of less than 2 seconds), while control samples with no impregnation burned completely.

Example 2

An aqueous dispersion of ethylene/vinyl acetate copolymer and a chlorinated paraffin was prepared by mixing 1 part by weight of ethylene/vinyl acetate copolymer containing 40% vinyl acetate and having a melt index of 45–65, and 3 parts of a chlorinated paraffin containing 60% by weight of chlorine, and codispersing the mixture as specified in Example 1, or by mixing the predispersed components. The resulting composition contained 45% by weight chlorine and coalesced into a clear, continuous coating.

One part of this dispersion was then mixed with 2 parts of an aqueous 25% solids dispersion of antimony trioxide having a pH above 7 and stabilized with a basic surfactant, dimerized wood rosin ("Dymerex"). Cotton test samples impregnated with the resulting dispersion and tested in the modified fire-retardance test as in Example 1, were non-burning (no after-flame) to self-extinguishing.

Example 3

An aqueous dispersion of ethylene/vinyl acetate copolymer and a chlorinated paraffin was prepared by mixing 1 part of ethylene/vinyl acetate copolymer containing 18% by weight of vinyl acetate and having a melt index of 2.5 with 4 parts by weight of a chlorinated paraffin containing 60% by weight of chlorine (e.g. "Chlorowax" 500) as specified in Example 1. The resulting aqueous dispersions contained from 50–60% solids. One part of this dispersion was then mixed with 1 part of an aqueous 25% solids dispersion of antimony trioxide, having a pH above 7. Cotton test samples impregnated with the resulting dispersion and tested in the modified flame-retardance test as in Example 1, were non-burning to self-extinguishing.

Example 4

An aqueous dispersion of a partially neutralized ethylene/methacrylic acid ionomer containing 11% by weight of methacrylic acid and neutralized 30% with sodium hydroxide and a chlorinated paraffin wax, containing 50–70% by weight chlorine, was prepared, as described in Example 1 or by blending aqueous dispersions of the components. The resulting dispersion contained about 45% solids in a ratio of 1:2 ionomer to "Chlorowax."

A dispersion of antimony trioxide as in Example 1 containing 25% solids was added and a film was cast with this blend, which was dried and coalesced at 93° C. The resulting film had good mechanical properties and was non-burning.

The dispersion was used to impregnate samples of cotton broadcloth 5A to about 30–40% add-on. The impregnated fabric samples were dried to constant weight at about 105° C. In the modified fire-retardance test, the samples were found to be self-extinguishing.

I claim:

1. A storage stable aqueous dispersion comprising as essential ingredients: (1) 70 to 15 percent by weight, based on the total ethylene copolymer and chlorinated wax, of an ethylene copolymer comprising at least 60 percent by weight of ethylene and 0.3 to 40 percent by weight of an alpha, beta-ethylenically unsaturated carboxylic acid, 10 to 100 percent of the acid groups being neutralized with alkali metal ions, (2) 30 to 85 percent by weight, based on the total ethylene copolymer and chlorinated wax, of a chlorinated paraffin wax having greater than 50 percent by weight chlorine, the total chlorine content of (1) and (2) being within the range of 20 to 60 percent by weight, and (3) antimony trioxide wherein the ratio of antimony trioxide to chlorinated wax is within the range of about 0.25:1 and 3:1, said dispersion having a solids content of 20 to 75 and being prepared by mixing an aqueous dispersion of the ethylene copolymer and the chlorinated paraffin wax with an aqueous dispersion of antimony trioxide.

2. The dispersion of claim 1 wherein the ethylene copolymer is 80 to 99.7 percent by weight ethylene and 0.3 to 20 percent by weight acrylic or methacrylic acid, and the dispersion contains 25 to 50 percent by weight ethylene copolymer and 75 to 50 percent by weight chlorinated paraffin wax, based on the total ethylene copolymer and chlorinated wax, the total chlorine content being within the range of 30 to 50 percent by weight.

References Cited

UNITED STATES PATENTS

| | | | |
|---|---|---|---|
| 3,347,811 | 10/1967 | Bissot | 260—29.6 |
| 3,256,228 | 6/1966 | Tyran | 260—28.5 |
| 2,669,521 | 2/1954 | Bierly | 260—41 B |
| 3,668,155 | 6/1972 | Raley | 260—28.5 AV |
| 3,394,097 | 7/1968 | Bissot | 260—28.5 AV |

OTHER REFERENCES

Rose, "The Condensed Chemical Dictionary," 5th edition, Reinhold Pub. Co., New York, 1956, p. 98.

MORRIS LIEBMAN, Primary Examiner

P. R. MICHL, Assistant Examiner

U.S.Cl. X.R.

117—136; 260—28.5 AV